(12) United States Patent
Torvik et al.

(10) Patent No.: US 11,989,291 B2
(45) Date of Patent: May 21, 2024

(54) SYSTEM, METHOD, AND APPARATUS FOR SOFTWARE VERIFICATION

(71) Applicant: Tulip Tree Technology, LLC, Indiatlantic, FL (US)

(72) Inventors: Ryan S. Torvik, Indiatlantic, FL (US); James A. Connor, Jr., Rockledge, FL (US)

( * ) Notice: Subject to any disclaimer, the term of this patent is extended or adjusted under 35 U.S.C. 154(b) by 196 days.

(21) Appl. No.: 17/361,354

(22) Filed: Jun. 29, 2021

(65) Prior Publication Data
US 2022/0414218 A1    Dec. 29, 2022

(51) Int. Cl.
*G06F 21/00*    (2013.01)
*G06F 21/56*    (2013.01)
*G06F 21/57*    (2013.01)

(52) U.S. Cl.
CPC ......... *G06F 21/562* (2013.01); *G06F 21/577* (2013.01); *G06F 2221/033* (2013.01)

(58) Field of Classification Search
CPC .................. G06F 21/562; G06F 2221/033
See application file for complete search history.

(56) References Cited

U.S. PATENT DOCUMENTS

| | | | |
|---|---|---|---|
| 10,181,035 B1* | 1/2019 | Shekokar | H04L 63/1425 |
| 2018/0068121 A1* | 3/2018 | Gray | G06F 8/74 |
| 2022/0067174 A1* | 3/2022 | Gupta | G06F 21/562 |

* cited by examiner

*Primary Examiner* — Tri M Tran
(74) *Attorney, Agent, or Firm* — Larson & Larson; Frank Liebenow; Justin P. Miller

(57) ABSTRACT

A system and method for software verification provides a lifting dictionary for each desired computer architecture. The lifting dictionary is used to translate native machine language instructions into descriptive intermediate language instructions. Each descriptive intermediate language instruction is atomic, in that, each descriptive intermediate language instruction changes at most one state of the emulated system. An emulator then runs the descriptive intermediate language instructions with tools that show each change of state after each DIL is emulated.

14 Claims, 8 Drawing Sheets

SYSTEM, METHOD, AND APPARATUS FOR SOFTWARE VERIFICATION

FIELD

This invention relates to the field of computer security and more particularly to a system for detecting and preventing malicious software.

BACKGROUND

Computer systems include a hardware platform that has a processor, memory, storage, networking, and input/output on which software operates to control what the computer systems perform. There are many software programs often called applications such as enterprise systems, billing systems, and database systems that are made up thousands or millions of lines of code written in various computer languages such as C++, COBOL, FORTRAN, etc., and compiled to run on one or more different processors and operating systems. Often times, due to cost efficiencies, part or all of such applications are written by firms outside of the control of the owner/operator of such applications and, sometimes, those firms are located or subcontract to others who are in entirely different countries.

Many software development projects include testing organizations, standards organization, and processes that not only help assure that the developed application performs the intended operation, being relatively bug-free, but also helps to assure that no malicious or superfluous code is present in the developed application.

There are many reasons why malicious or superfluous code will find its way into such large applications, both with intended harm and without intended harm. Sometimes, malicious or superfluous code will find its way into such large applications being inserted by a software developer to help debug or access certain portions of the application. Often, such code is inserted without meaning any harm and the software developer has every intention of deleting such code after completion of the application. The software developer might include code that writes logs to trace files to track operation of the application or might include code that permits access to certain internal operations of the application (e.g., known as back-door access), again, both for debugging and testing the application, not for malicious reasons. Unfortunately, once the application is in a production environment and contains these malicious or superfluous codes, an outsider with malicious intent is able to find such weaknesses and break into the application, for example, extracting account information of users, competitive data, new product strategies, etc.

Sometimes, malicious or superfluous code will find its way into such large applications being purposefully inserted by a software developer with intent to later harm the owner of the applications. In one example, the software developer overtly includes code that permits access to certain internal operations and data of the application. Once the code is up and running in a production environment, such code allows access to sensitive information such as account information of users, competitive data, new product strategies, etc. In another example, the software developer overtly includes code that periodically transmits sensitive information such as usage data, account information of users, competitive data, new product strategies, etc., through a network to a computer owned by that software developer. Such data is then used in corporate espionage, political espionage, used to sell user data to others (e.g., social security numbers, bank account numbers) for later use in illegally access other systems such as banking systems, etc. There have been examples of such transmissions. One such example occurred in 2016. It was discovered that a Chinese cellphone manufacturer, Transsion, marketed a handset designated Tecno W2 in Africa. Backdoor software known as Triada malware installed in this handset is suspected of signing mobile users up to subscription services without their permission.

Such noted software systems are often very complicated having tens of thousands or millions of lines of code. Generally, software systems receive information (e.g., from external sources), process that information, and produce outputs/changes. During the processing of the information, unsafe manipulations (also called vulnerabilities) are open to leveraging by malicious actors to gain access to the software system. These vulnerabilities are the biggest threat to personal and national security in the modern world. To mitigate this threat, it is desired that security professionals are be able to quickly and effectively determine if a software system safely processes information.

Currently, security professionals (e.g., Information Technologists) use a combination of techniques to verify the integrity of software systems. The security professionals debug running systems using sample inputs and recording outputs. The security professionals audit a target system's high level source code and low-level compiled instructions. The security professionals apply algorithms to the compiled instructions. Each technique analyzes the target system in a different way, but all looking for unsafe data manipulations.

As an example, debugging requires the security professional to run the target computational system in a controlled environment under the watch of a debugger. A debugger is typically either software or customized hardware. Either way, the debugger provides the security professional with tools for examining the internal state of the running software system. After starting the debugger, the security professionals provide sample inputs to the software system while it runs under control of the debugger. While running the software system, the security professionals observe the internal states watching for data manipulations that modify the internal states in an unsafe way. This technique is limited to observing code paths that are executed based on the sample inputs, but certain paths are not exercised as the security professional does not know certain input combinations that would trigger different internal states such as a back-door access.

Auditing requires the security professional to manually read through the high-level source code or the compiled instructions for the software system. The security professionals look for programming practices that will process external information in an unsafe way. As this collection of source code and compiled instructions is very large, the auditing technique is time consuming and inefficient, but allows the security professional to explore sections of the software system that are not exercised by debugging.

Another mechanism is to apply algorithms that run against the software system. This mechanism requires the security professional to process the target computational system's compiled instructions in an abstract way that explicitly describes how each instruction manipulates the provided information. These algorithms programmatically look for unsafe data manipulations. Unfortunately, instruction sets of computational systems are designed to quickly and efficiently modify the internal state of the computational system. As such, a single instruction can cause effects on multiple parts of the internal state. In order for an algorithm to be able to programmatically determine how the internal state is modified, it needs to understand all the effects that each instruction has.

What is needed is a system that will help detect the inclusion of superfluous, errant, or malicious code in applications.

SUMMARY

The embodiments contained herein describe a system to address the weaknesses of the current verification methods that scan software for vulnerabilities. A lifting dictionary is created to translate a target instruction set into a descriptive intermediate language (DIL). The target computational system is then described to the emulator. Instruments are selected to receive information about the running system. Instruments are tools that get notified or called into when specific events happen. These instruments enable the algorithms to operate properly and provide various types of tracing during execution (e.g., report when a certain range of memory is accessed).

Using the lifting dictionary, the target software is translated (lifted) into the descriptive intermediate language. Initial inputs are selected for the running system. The emulator executes the translated instructions. Analysis is performed either during or after execution. In some embodiments, all of the configuration, execution, and analysis is performed on a remote system with user interactions occurring through a web-browser.

In this lifting, the software is translated from a target instruction set (i.e., x86, ARM, MIPS) into an abstract intermediate language that explicitly describes each state modification each instruction makes. Given this abstract intermediate language, a detection algorithm is able operate effectively. Detection algorithms are generated to explore code paths that are not executed during debugging. Since the intermediate language is not tied to any specific architecture, detection algorithms can be used without modification on any different target instruction set.

The embodiments disclosed herein describe a system to make searching for software vulnerabilities more efficient and effective.

In one embodiment, a system for software verification is disclosed including software running from a non-transitory memory on a computer. The software reads machine-language code that is for running on a target computer system and converts the machine-language code into a descriptive intermediate language version of the machine-language code. The software lifts the code using a dictionary of a descriptive intermediate language. The software runs the descriptive intermediate language version of the machine-language code in an emulation environment that provides abstractions of hardware subsystems of the target computer system and the software analyzes the descriptive intermediate language version of the machine-language code to uncover abnormalities in the descriptive intermediate language version of the machine-language code.

In another embodiment, a method for software verification includes reading machine-language code that is for running on a target computer system and converting the machine-language code into a descriptive intermediate language version of the machine-language code; the converting lifts the machine-language code using a dictionary of a descriptive intermediate language. The descriptive intermediate language version of the machine-language code is run in an emulation environment, providing abstractions of hardware subsystems of the target computer system by the emulation environment and the descriptive intermediate language version of the machine-language code is analyzed using a library of known vulnerabilities, thereby uncovering abnormalities in the descriptive intermediate language version of the machine-language code.

In another embodiment, program instructions tangibly embodied in a non-transitory storage medium of a computer for providing software verification are disclosed. At least one instruction includes computer readable instructions running on a server. The computer readable instructions cause the server to read machine-language code that is for running on a target computer system and to convert the machine-language code into a descriptive intermediate language version of the machine-language code. The computer readable instructions running on the server lifts the machine-language code using a dictionary of a descriptive intermediate language. The computer readable instructions running on the server runs the descriptive intermediate language version of the machine-language code in an emulation environment and provides abstractions of hardware subsystems of the target computer system by the emulation environment and the computer readable instructions running on the server analyzes the descriptive intermediate language version of the machine-language code using a library of known vulnerabilities, thereby the computer readable instructions running on the server uncovers abnormalities in the descriptive intermediate language version of the machine-language code.

BRIEF DESCRIPTION OF THE DRAWINGS

The invention can be best understood by those having ordinary skill in the art by reference to the following detailed description when considered in conjunction with the accompanying drawings in which:

FIG. 6 illustrates the exemplary computer of the prior art, showing a file system in storage.

DETAILED DESCRIPTION

Figure 1:
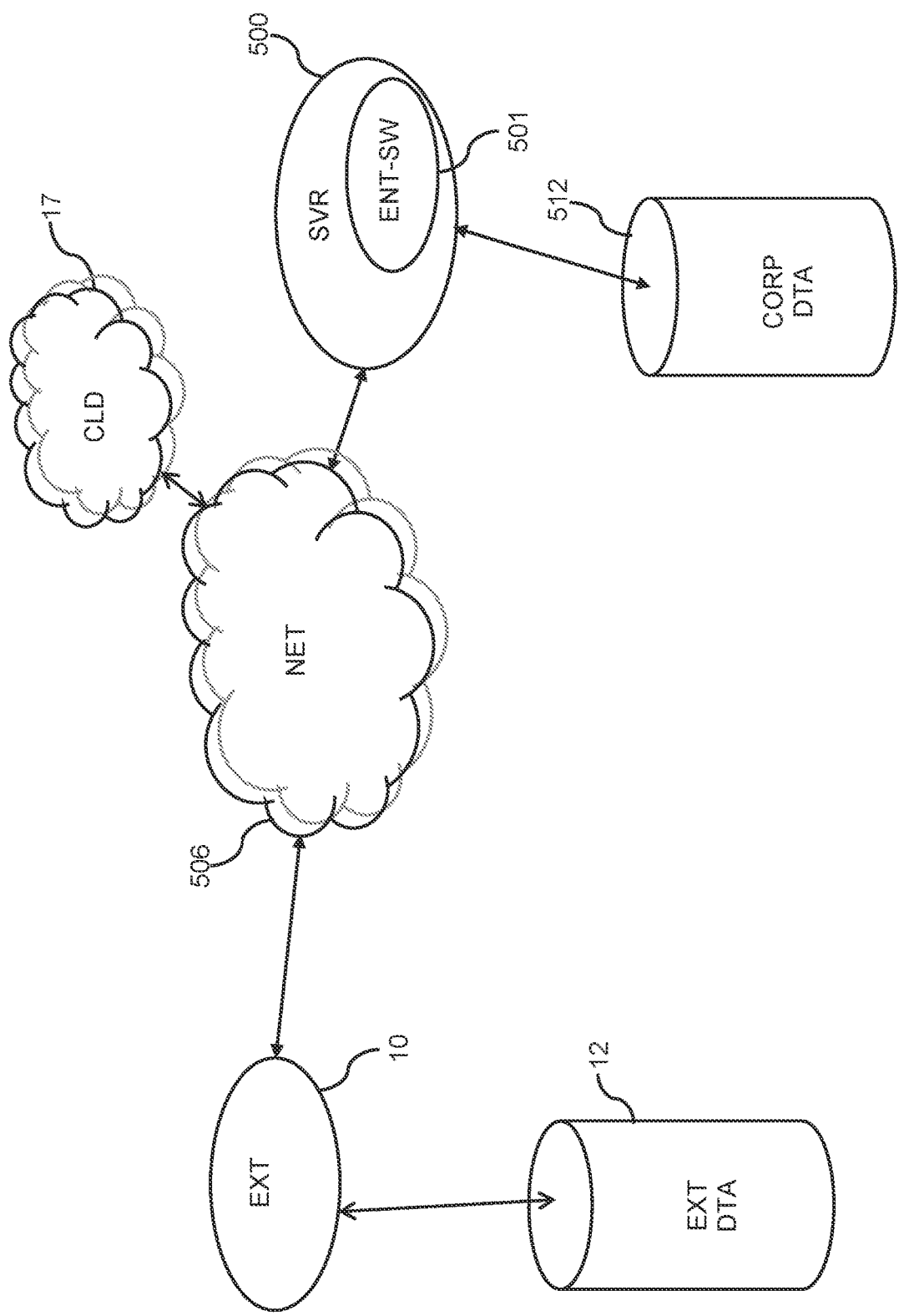
FIG. 1 illustrates a data connection diagram of the system for software verification.

Reference will now be made in detail to the presently preferred embodiments of the invention, examples of which are illustrated in the accompanying drawings. Throughout the following detailed description, the same reference numerals refer to the same elements in all figures.

In general, the system for software verification provides an enhanced level of protection from such malicious software by searching software for errant code.

Throughout this description, the term, "computer" refers to any system that has a processor, runs software, and is vulnerable to errant code that has been inserted, either maliciously or inadvertently. Examples of such computers are: a personal computer, a server computer, a notebook computer, a tablet computer, a smartphone, a smart watch, a smart television, a smart lightbulb, a smart thermostat, etc.

Throughout this description, the term, "errant code" refers to any software, software routine, software library, software segment, etc., that has the ability to provide a malicious person or organization with access to the software and/or data and/or system upon which the software operates. In some situations, the errant code is overtly inserted by a software developer, either for valid reasons such as for testing or for malicious reasons such as being able to access data from the system after the system goes live. In some situations, the errant code is inadvertently included as part of the software system, for example, a software routine that allows a stack overflow or a variable that is not properly tested to be within an expected range, etc.

In general, system for software verification determines if a software program (e.g., an executable, macro, library, module, etc.) includes errant code by normalizing the software (e.g., compiling the software) using a common, atomic instruction set, then running the software using a debugging system that monitors all operations, which are atomic due to the atomic instruction set. The term, "atomic instruction" indicates that each instruction performs only a single operation. For example, in many computer architectures, a "call X" instruction is not atomic as the instruction first decrements a stack pointer, then stores the return address at the location pointed to by the stack pointer, then branches to the location identified by the call instruction (e.g., the "X" in "call X"). This compound instruction would be represented, for example, by three separate atomic instructions in the atomic instruction set.

Referring to FIG. 1 illustrates a data connection diagram of a typical system of the prior art for which software verification is needed. In this example, an external computer 10 (e.g., a computer that is outside of a protected corporate network) communicates through a network 506 (e.g., the Internet, local area network, etc.) to a server computer 500. The external computer 10 has external data 12 that is reported to the server computer 500 through the network 506. For example, the external computer 10 is a bank system that reports external data 12 such as financial transaction data to the banking server, e.g., server computer 500.

The server computer 500 has access to data storage 512. In the example above, the data storage 512 includes account records for banking customers.

Although one path between the protected the external computer 10 and the server computer 500 is shown going through the network 506 as shown, any known data path is anticipated. For example, the Wi-Fi transceiver 96 (see FIG. 2) of the external computer 10 is used to communicate with the wide area network 506, which includes the Internet, and, consequently, with the server computer 500.

Enterprise software 501 runs on the server computer 500 and transacts with the external computer 10 through the network(s) 506. If the enterprise software 501 has errant code embedded there within, it is possible that a given combination of external data 12 will cause the errant code to fail, in some cases, exposing the data storage 512 (e.g., customer bank account information) to unauthorized users, possible for malicious reason. Further, as often the network 506 is a public network, in some cases, the external computer 10 is not a member of the software system, but a hacker, for example, a hacker that purposely inserted the errant code into the enterprise software 501. In this case, the hacker sends certain data to the enterprise system 501 that invokes the errant code and gains access to the data storage 512, obtaining, changing, or destroying data stored in the data storage 512, for example, changing an account balance from $100.00 to $100,000.00.

Figure 2:
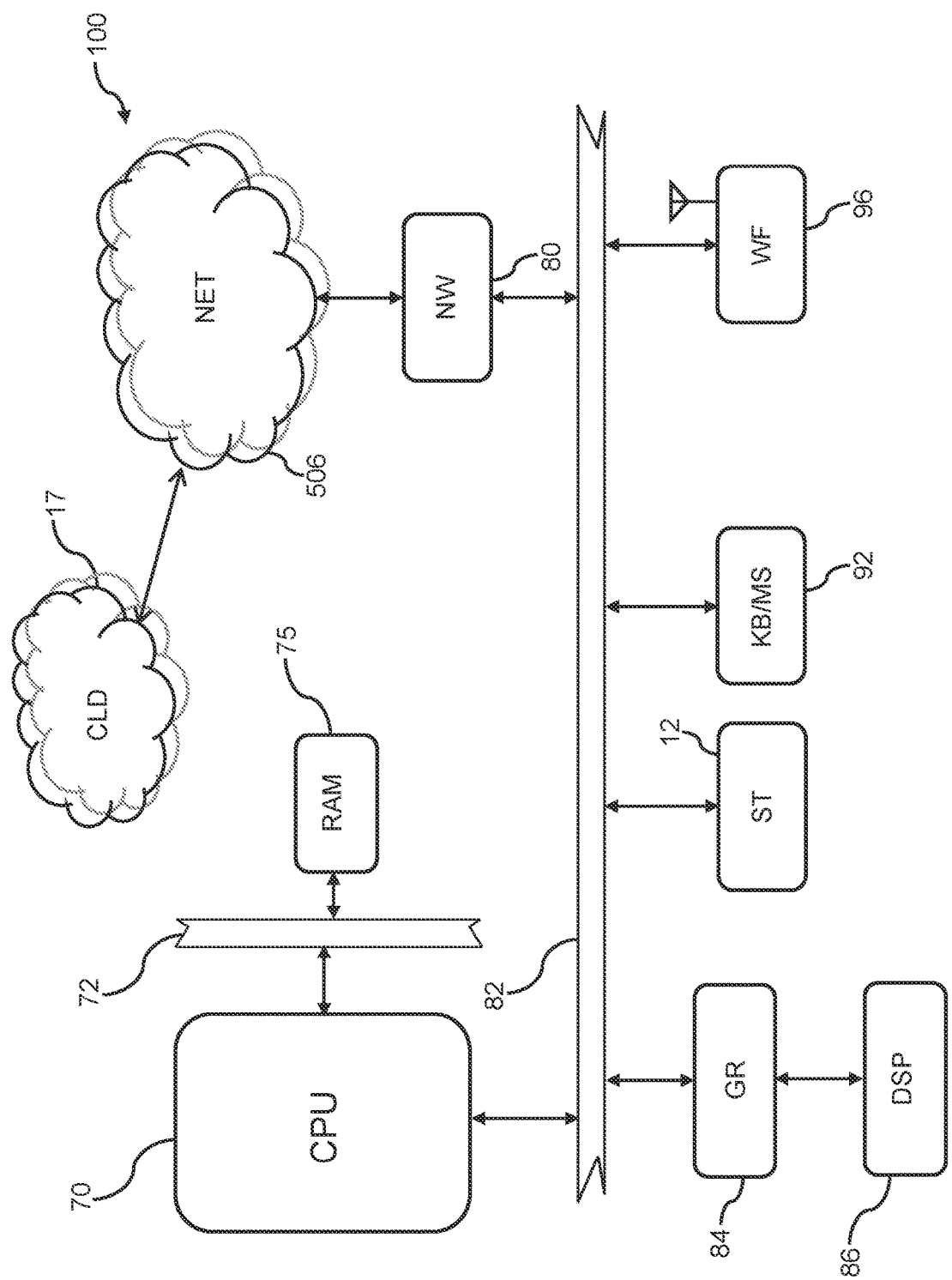
FIG. 2 illustrates a schematic view of a typical computer of the system for software verification.

Referring to FIG. 2, a schematic view of a typical computer 100 is shown. The system for software verification runs on a computer 100, for example, server computer 500. The computer 100 is any processor-based device on which part or all of the system for software verification runs or, similarly, an enterprise software system will run. The present invention is in no way limited to any particular computer 100. Many other processor-based systems are equally anticipated including, but not limited to super computers, server computers, smart phones, cellular phones, portable digital assistants, routers, thermostats, fitness devices, smart watches etc.

This typical computer 100 represents a typical device that is capable of running enterprise software that is analyzed by the system for software verification or a typical device that is used by the system for software verification to analyze such enterprise software. This typical computer 100 is shown in its simplest form. Different architectures are known that accomplish similar results in a similar fashion, and the present invention is not limited in any way to any particular computer system architecture or implementation. In this typical computer 100, a processor 70 executes or runs programs in a random-access memory 75. The programs are generally stored within a persistent memory (e.g., storage 12 such as flash memory or a hard drive) and loaded into the random-access memory 75 when needed. The processor 70 is any suitable processor. The random-access memory 75 is interfaced to the processor, for example, by a memory bus 72. The random-access memory 75 is any memory suitable for connection and operation with the selected processor 70, such as SRAM, DRAM, SDRAM, RDRAM, DDR, DDR-2, etc. The storage 12 is any type, configuration, capacity of memory suitable for persistently storing programs and data, for example, flash memory, read only memory, battery-backed memory, hard disks, etc. In some exemplary protected computers 10, the storage 12 is removable, in the form of a memory card of appropriate format such as SD (secure digital) cards, micro-SD cards, compact flash, etc.

Also connected to the processor 70 is a system bus 82 for connecting to peripheral subsystems such as a network interface 80, a graphics adapter 84 and input/output devices 92 such as mice, keyboards, etc. The graphics adapter 84 receives commands from the processor 70 and controls what is depicted on the display 86.

In general, some portion of the storage 12 is used to store programs, executable code, and data, etc. In some embodiments, other data is stored in the storage 12 such as audio files, video files, text messages, etc.

The peripherals shown are examples, and other devices are known in the industry such as Global Positioning Subsystems, speakers, microphones, USB interfaces, cameras, microphones, Bluetooth transceivers, Wi-Fi transceivers 96, image sensors, temperature sensors, etc., the details of which are not shown for brevity and clarity reasons.

In some embodiments, a network interface 80 connects the computer 100 to the network 506 through any known or future protocol such as Ethernet, Wi-Fi, GSM, TDMA, LTE, etc. There is no limitation on the type of connection used. In such, the network interface 80 provides data and messaging connections through the network 506, connecting the computer 100 to other computer systems such as the Internet. In some embodiments, remote storage is accessible through the network 506, for example, cloud storage 17.

Figure 3:
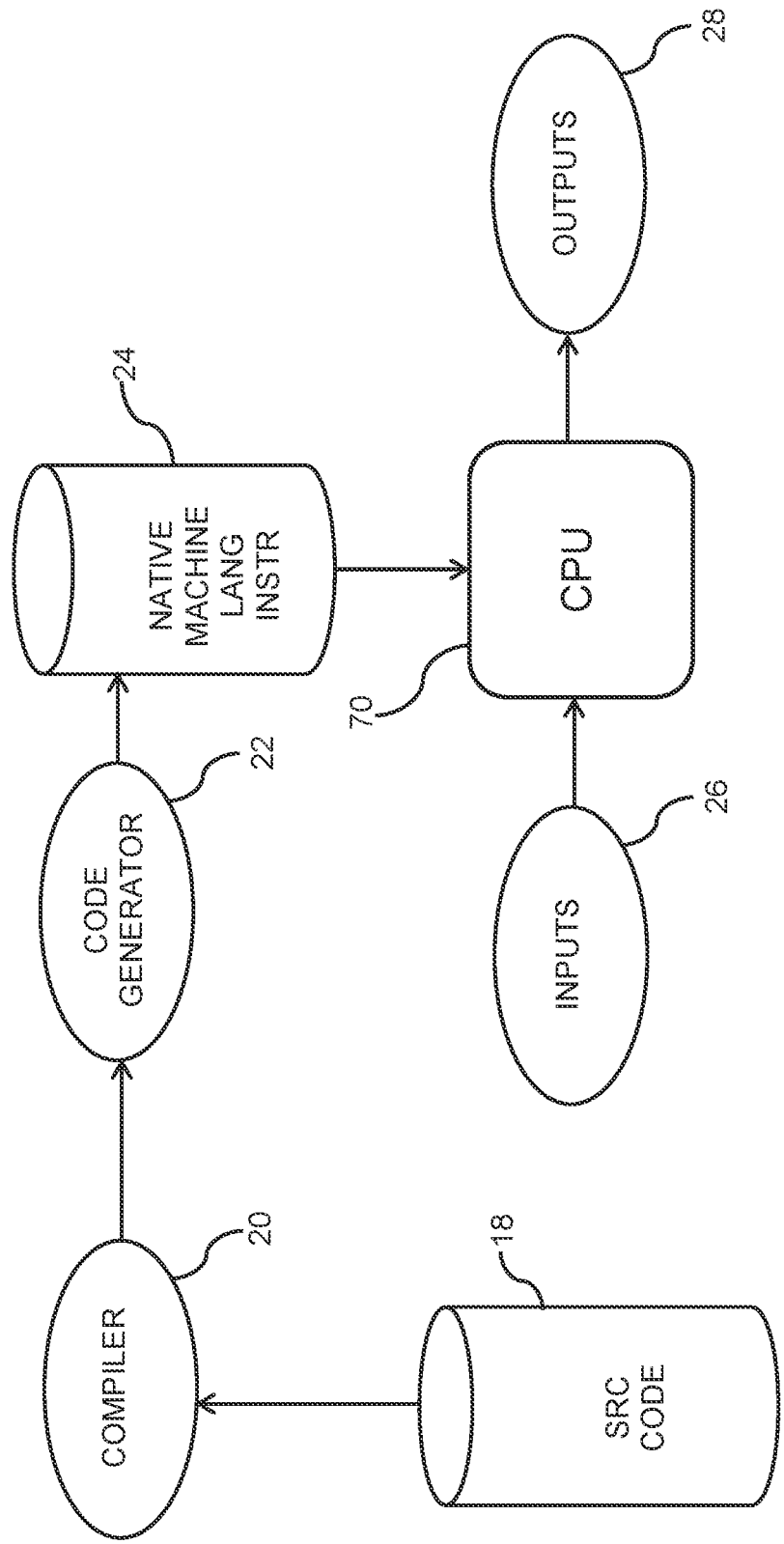
FIG. 3 illustrates a sample code compilation of the prior art.

Referring to FIG. 3, a sample code compilation system of the prior art is shown. In such, source code 18 (e.g., thousands of lines of code written in a computer language such as C++, Fortran, Cobol, Visual Basic, etc.) is read by a compiler 20. The compiler 20 typically checks the source code 18 and uses a code generator 22 to convert the source code into machine language code that is specific to the target processor 70. There may be many different code generators 22 for various processors. The code generator 22 creates an executable in the native machine language instructions 24 of the intended processor 70. When this executable is run on the computer 100, the processor 70 reads and decodes each instruction (see FIG. 4) resulting in inputs 26 being read, outputs 28 being generated and computations/translations performed within the processor 70 or associated hardware.

As discussed, often the source code 18 is very long and complicated. Prior control systems using testing and code reviews often do not find all errant routines in the source code 18, as it is very difficult to simulate all possible inputs 26 to find any outputs 28 that are not as expected.

As discussed, one reason it is difficult to simulate all possible inputs 26 to find any outputs 28 that are not as expected is the complexity of processors 70 currently in existence. Often, a processor 70 decodes a single instruction into many distinct operations. For example, one instruction might cause the processor to move blocks of data from one location to another location in memory 75, move blocks of data from memory 75 to an output such as a graphics adapter 84, or change multiple internal/external registers and flags in one operation. For example, a call instruction typically subtracts a value (the number of bytes in an address) from a stack pointer, stores the current program counter at the new value for the stack pointer, then branches to the location defined by the operand of the call instruction. To better understand this process, a simplified processor 70 is shown in FIG. 4.

Figure 4:
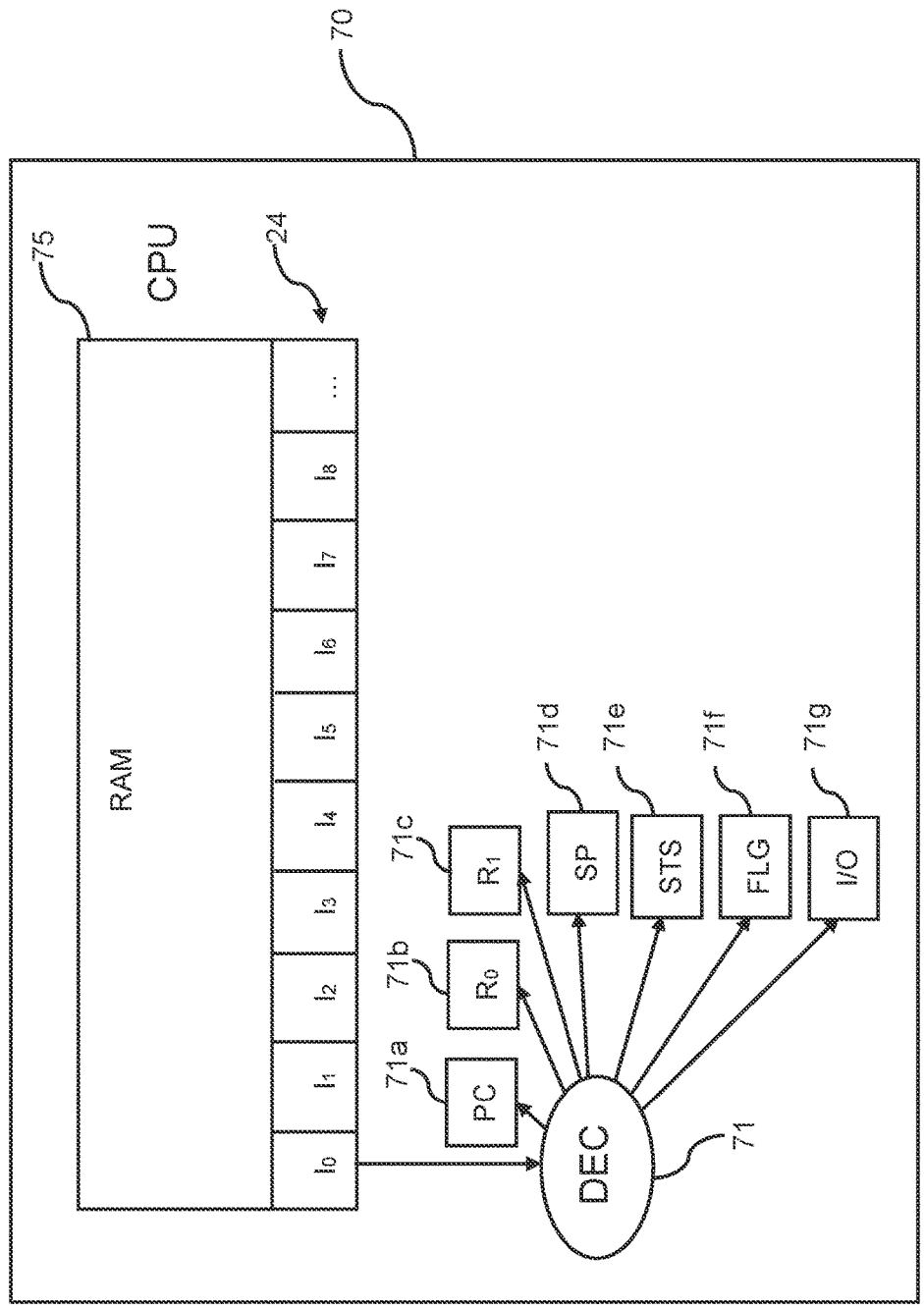
FIG. 4 illustrates a sample computer architecture of the prior art.

Referring to FIG. 4, a sample computer architecture of the prior art is shown. In this example, a processor 70 has the native machine language instructions 24 stored in memory 75. A decoder 71 reads each instruction (the instruction addressed by the program counter 71a), decodes that instruction, and changes internal/external states based upon the instruction, current internal/external states, memory 75, etc. In this sample computer architecture, the internal/external states are simplified to a program counter 71a, two registers 71b/71c, a stack pointer 71d, a status register 71e, a flag 71f, and an input/output port 71g. In the above example of the call instruction, the decoder 71 reads the instruction (e.g., $I_0$), then reads the stack pointer 71d, subtracts the number of bytes needed for an address (e.g., subtracts 8 for a 64-bit address), then writes back the adjusted stack pointer. The decoder 71 then reads the program counter 71a, adds the length of the instruction (e.g., $I_0$ for example 6 bytes) to calculate a return address, and then stores the return address at the location in memory 75 pointed to by the stack pointer. The decoder 71 then sets the program counter 71a to the address in the operand of the call instruction (e.g., $I_0$), thereby branching to the location of the operand of the call instruction. Many instruction sets of processors 70 include instructions that perform several internal tasks while very few instruction sets of processors 70 are atomic, in that they execute a single task.

Figure 5:
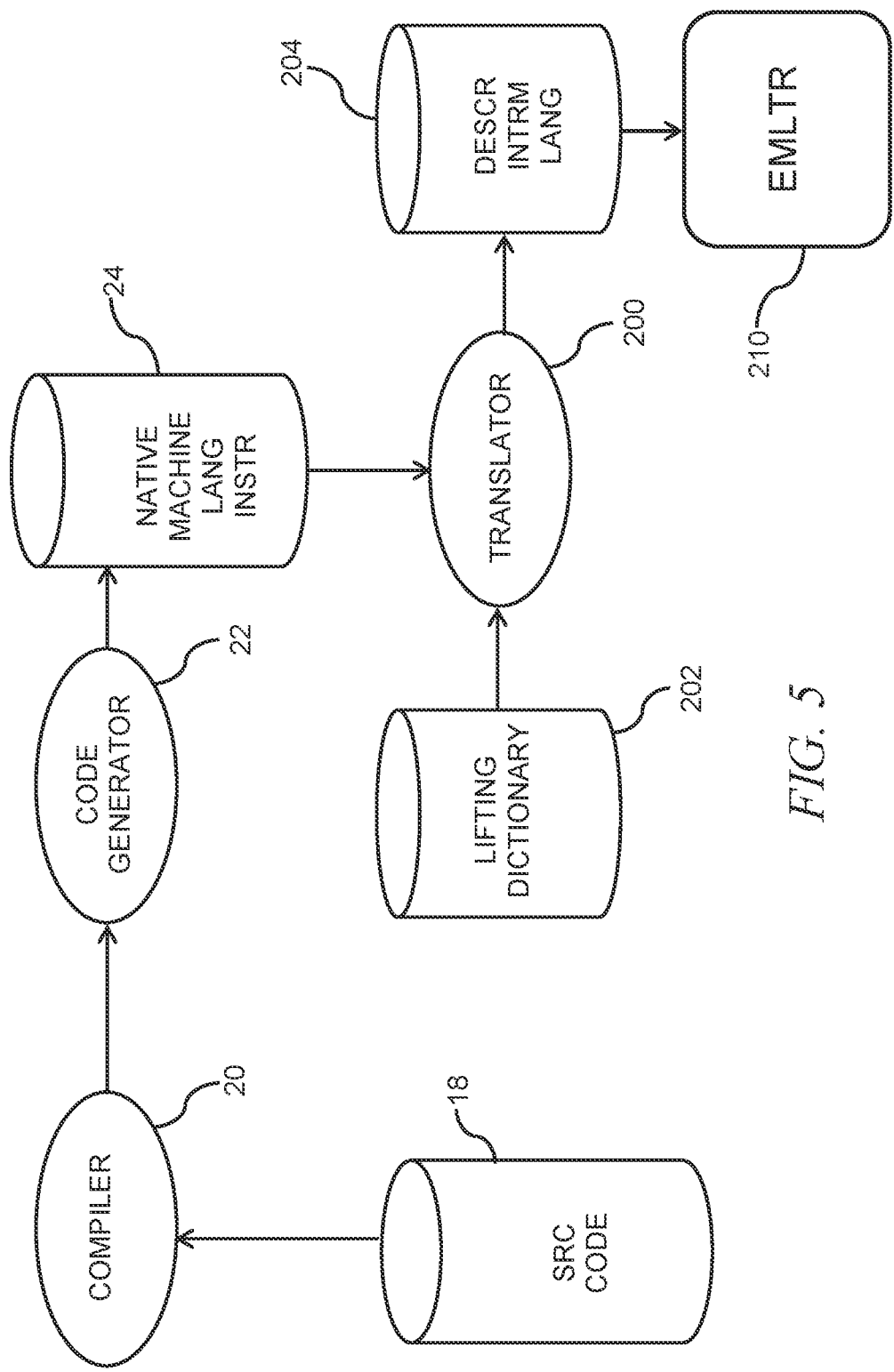
FIGS. 5 and 6 illustrate interaction diagrams of the system for software verification.

Referring to FIG. 5, an interaction diagram of the system for software verification is shown. As with FIG. 3, source code 18 (e.g., thousands of lines of code written in a computer language such as C++, Fortran, Cobol, Visual Basic, etc.) is read by a compiler 20. The code generator 22 of the compiler 20 converts the source code 18 into machine language instructions that are dependent on the target processor.

The code generator 22 is specific to the target processor 70. There may be many different code generators 22 for various processors. The code generator 22 creates an executable (e.g., machine language code) in the native machine language instructions 24 of the intended processor 70.

A translator 200 of the system for software verification receives the native machine language instructions 24 and translates the native machine language instructions 24 into instructions of a descriptive intermediate language 204 (DIL) version of the machine language instruction 24 using a lifting dictionary 202. As there are many processors 70 (e.g., ARM, x86, M1 . . . ) each having unique native machine language instructions 24, and, therefore, it is anticipated that there is a lifting dictionary 202 for each target processor as each instruction set varies. This translation process is called lifting.

Lifting decomposes each of the native machine language instructions 24 into instructions of the descriptive intermediate language 204 (DIL) using a lifting dictionary 202 designed for the processor 70 that would execute said native machine language instructions 24. Each descriptive intermediate language 204 instruction contains exactly one atomic data manipulation operation as the descriptive intermediate language 204 is an atomic language. As such, each native machine language instruction 24 will translate into one or more descriptive intermediate language 204 instructions.

As an example, the above noted call instruction, which in one native machine language instruction 24 is mnemonically represented as "call <addr>" and the native machine language instruction 24 is 0xOOAAAA, where OO is the opcode for call (e.g., near call) and AAAA is the 16-bit address of the routine that is to be called. As an example, this native machine language instruction 24 is translated by the translator 200 into three descriptive intermediate language 204 instructions:

```
INT_SUB RSP, 8     // decrement the stack pointer
STORE RAM(RSP), PC // store the program counter on the stack
BRANCH *[RAM]AAAA  // this changes PC to AAAA
```

Once the native machine language instructions 24 of the software system is converted into the descriptive intermediate language 204, verification operations are performed on the descriptive intermediate language 204 version of the software system. In FIG. 5, the descriptive intermediate language 204 version of the software system is run in an emulator 210 that abstracts the target architecture and simulates inputs, outputs, interrupts, memory operations, etc., of the target architecture. As each target computational system is unique, the target computational system is described to the emulator 210 or an emulator 210 for each target computational system is created as each target computational system has not only a certain processor architecture, but also unique hardware architectures including memory architectures, storage (e.g., hard disks, flash), busses, input/output ports, interrupt management, dedicated hardware such as accelerators and graphics, etc. Each emulator 210 not only emulates the operations of the descriptive intermediate language 204, but also emulates the operations of the unique hardware architectures of the target computational system, simulating inputs, outputs, interrupts, etc.

The emulator includes various instruments to aid in the verification process during emulation. These instruments are tools that get notified or executed when specific events happen. For example, one instrument prints/displays each native instruction before the emulator 210 executes the descriptive intermediate language 204 instructions that were lifted from that native instruction. Another example is an instrument that generates a call graph showing sequences of subroutine execution. Another example is an instrument that reports when a specific value is found at a specific memory location (e.g., for finding known vulnerabilities). Another example is an instrument that observes when a data structure is created on the heap, determining the format of the data structure and generating a report when data in the data structure does not line up with expectations. Another example is an instrument that marks portions of memory that include uninitialized content and reports when the program being analyzed reads/writes to those locations, as it would not make sense for a read from a certain location in uninitialized memory before a write is performed as the value of that memory is random.

Take, for example, creating an emulator for a simple target computational system of a LED lightbulb based on an ARM processor. As the native machine language instructions 24 (ARM instructions) for the system software have been converted into descriptive intermediate language 204 instructions, the base emulator already knows how to interpret the descriptive intermediate language 204 instructions, that part is standard across all emulators 210. The emulator for the LED lightbulb must be constructed to simulate receiving and transmitting data over a Wi-Fi transceiver and to simulate an output port that controls the brightness of the LEDs (e.g., a 4-bit output port for brightness between off and full-on in sixteen steps). Once the emulator 210 is created, the system software described in the descriptive intermediate language 204 instructions are executed by the emulator 210, simulating expected data received from the Wi-Fi transceiver, recording data sent to the Wi-Fi transceiver, and recording various output settings of the output port, responsive to data received from the Wi-Fi transceiver. In this way, errant behavior of the system software such as transmission of errant data to the Wi-Fi transceiver is detected.

Figure 6:
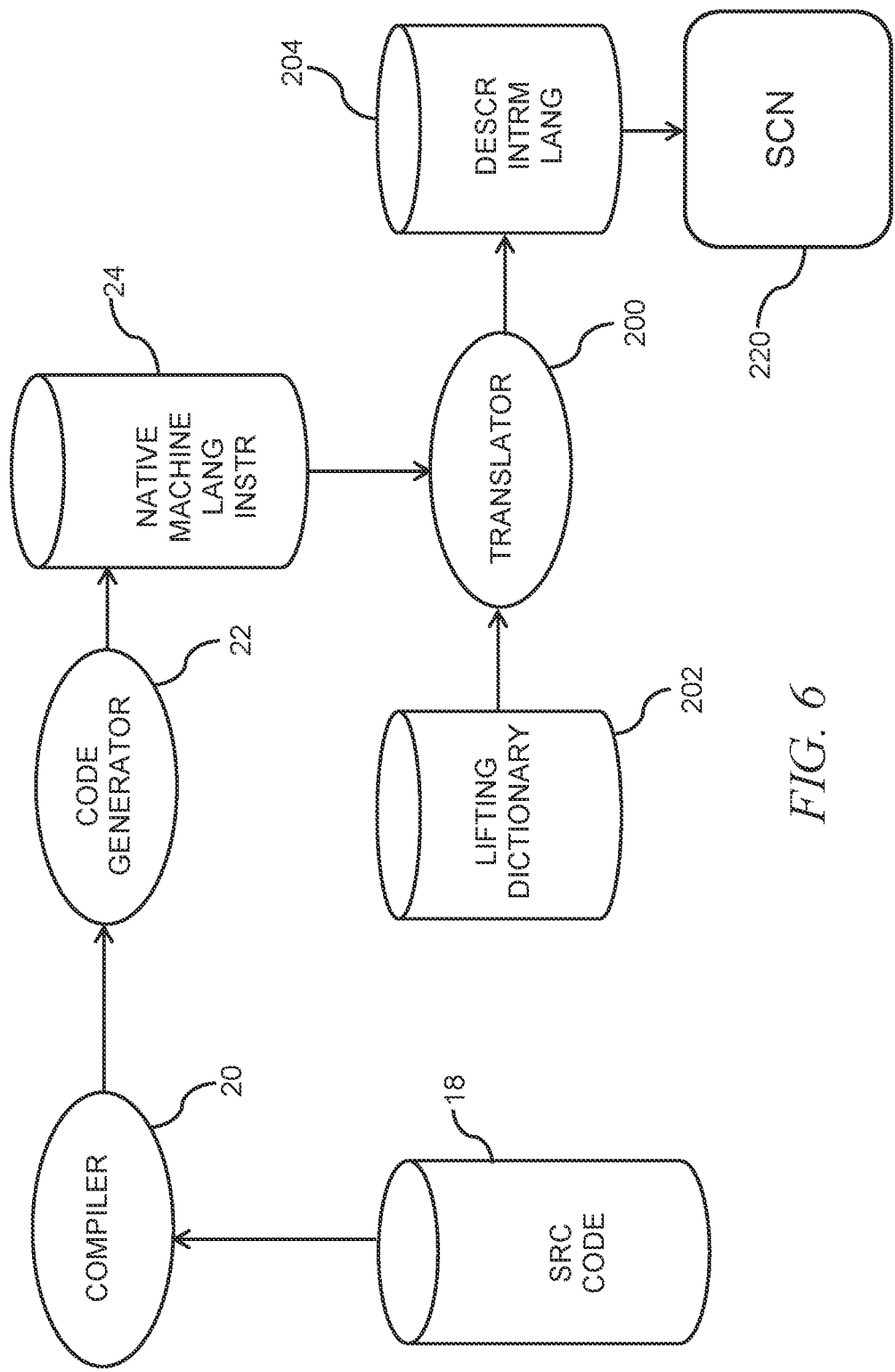

Referring to FIG. 6, a second interaction diagram of the system for software verification is shown. As with FIG. 3, source code 18 is read by a compiler 20. The code generator 22 of the compiler 20 converts the source code 18 into machine language instructions that are dependent on the target processor. There may be many different code generators 22 for various processors. The code generator 22 creates an executable in the native machine language instructions 24 of the intended processor 70.

A translator 200 of the system for software verification receives the native machine language instructions 24 and translates the native machine language instructions 24 into instructions of a descriptive intermediate language 204 (DIL) using a lifting dictionary 202 as described above. Lifting decomposes each of the native machine language instructions 24 into instructions of the descriptive intermediate language 204 (DIL) using a lifting dictionary 202 designed for the processor 70 that would execute said native machine language instructions 24. Each descriptive intermediate language 204 instruction contains exactly one atomic data manipulation operation. As such, each native machine language instruction 24 will translate into one or more descriptive intermediate language 204 instructions (see the example above).

Once the native machine language instructions 24 of the software system is converted into the descriptive intermediate language 204, verification operations are performed on the descriptive intermediate language 204 version of the software system. In FIG. 6, the descriptive intermediate language 204 version of the software system is scanned by a scanner 220 for known patterns of errant code (e.g., abnormalities or vulnerabilities). In some embodiments, the scanner 220 uses heuristics to search for certain pattern or types of code segments that have been identified as errant code. In some embodiments, the scanner 220 uses a learning process (e.g., artificial intelligence) that is taught using past code segments that are known to be errant, learning how such code segments perform errant functions, and predicts future code segments that should be examined.

Take, for example, scanning descriptive intermediate language 204 instructions for a simple target computational system of a LED lightbulb based on an ARM processor. As the native machine language instructions 24 (ARM instructions) for the system software have been converted into descriptive intermediate language 204 instructions, the scanner 220 uses heuristics or artificial intelligence to scan the descriptive intermediate language 204 instructions for known errant code sequences. For example, if it known that an errant code sequence for back-door access compares an input stream to a fixed string of characters (e.g., compares an input stream to "passw0rd!"), then the scanner 220 will look for similar comparisons and flag each as potential errant code and, even better, when a certain fixed string is known to be used by hackers (e.g., "password" or "passw0rd!"), then the scanner 220 will also look for such fixed strings.

Figure 7:
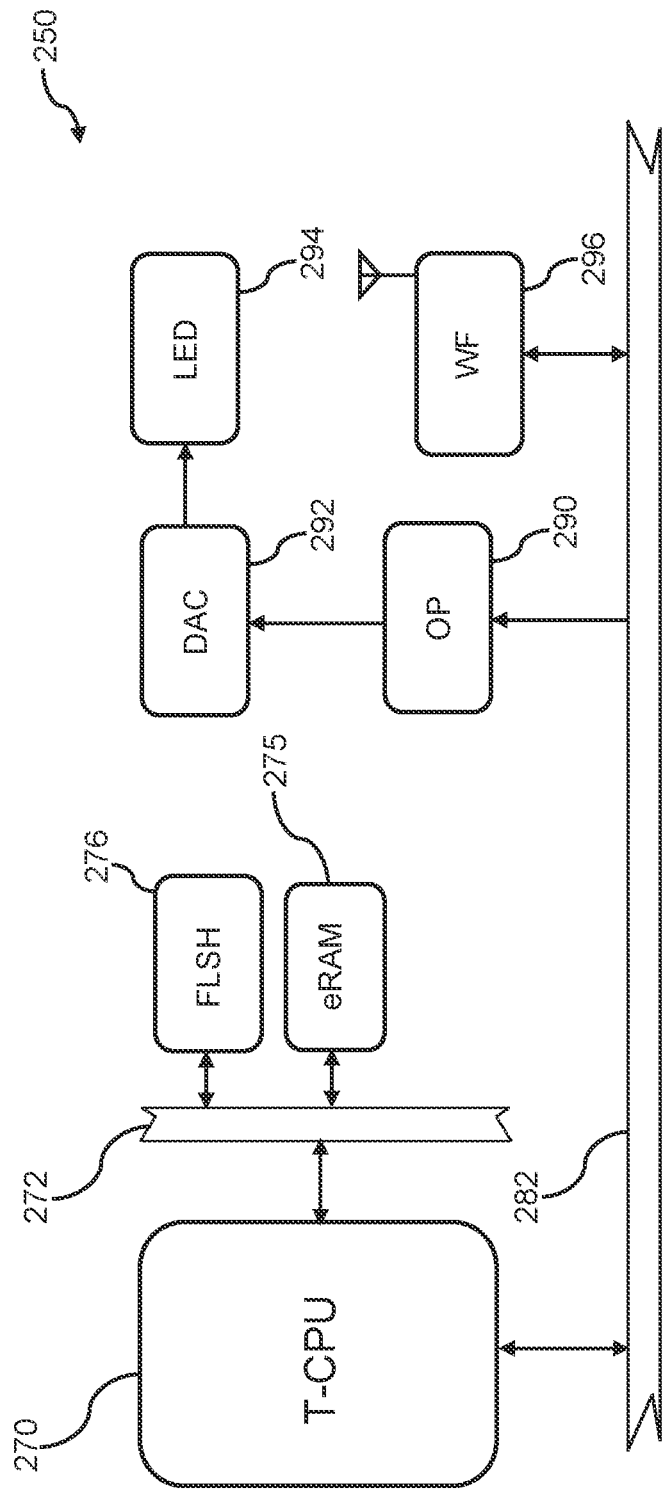
FIG. 7 illustrates a sample computer architecture of the prior art.

Referring to FIG. 7, a sample computer architecture 250 for a smart light bulb of the prior art is shown. The sample computer architecture 250 as used in the above examples has a single-chip RISC processor 270 on which part or all of an enterprise software system will run. The single-chip RISC processor 270 executes or runs programs in an embedded random-access memory 275 and/or from flash memory 276. The single-chip RISC processor 270 is any processor, typically designed for embedded applications. The random-access memory 275 and flash memory 276 are interfaced to the processor by, for example, an internal memory bus 272.

The single-chip RISC processor 270 has a system bus 282 or other means for connecting to an output port 290 and a Wi-Fi transceiver 296.

In operation, software running on the single-chip RISC processor 270 receives commands from the Wi-Fi transceiver 296, controls the output port 290 to signal a digital-to-analog converter 292 to control the brightness of one or more LEDs 294, and transmits status and acknowledgements to the Wi-Fi transceiver 296.

Note that in the prior art, it has been suspected that a certain such smart light bulbs with similar computer architectures 250 have periodically transmitted errant data back to their country of origin.

It is fully anticipated that both emulation (in an emulation environment) and/or scanning be performed in any sequence to better locate and isolate errant codes.

It is difficult to discover vulnerabilities of source code as well as of resulting machine-level code. To improve discoverability of such vulnerabilities, the source code is compiled into the descriptive intermediate language and the resulting program in the descriptive intermediate language is reviewed, scanned, and/or emulated to find vulnerabilities. As there are many programing languages and many machine languages, it is difficult to find patterns that relate to vulnerabilities in these languages while, in contrast, it is easier to uncover patterns in a single, descriptive intermediate language in which the examining person or machine will learn to look for certain patterns that indicate potential vulnerabilities that may not be exercised during standard software testing.

It is assumed that an emulator will provide for execution of the target program after the target program is compiled into the descriptive intermediate language, either emulating the program directly or converting the program in the descriptive intermediate language into a binary format and emulating the program in the binary format. In order to emulate any such program in descriptive intermediate language, certain hardware execution environments must be emulated as well. For example, to emulate a program running on the sample computer architecture 250 of the smart light bulb, there must be emulation of the processor, a memory (RAM), an input (e.g., a Wi-Fi receiver), and an output (e.g., the output port controlling current to the LEDs of the smart light bulb.

To provide such an execution environment, modules are created for each subsystem. A sample configuration is shown below:

```
name: lightbulb
bus:
    processor:
        - lifter: arm.lifter
            instruments:
                - intercept_reads_to_wifi
    devices:
        - name: ram
            start_address: 0x0000
            size: 0x1000
            kind: generic.ram
        - name: firmware
            start_address: 0x1000
            size: 0x1000
            kind: generic.rom
            details:
                backing_file: firmware.rom
        - name: wifi_card
            start_address: 0x2000
            size: 0x1000
            kind: generic.wifi_card
```

In the above, a processor is defined as an ARM type processor with RAM defined starting at 0x0000 and having 0x1000 bytes. Firmware (e.g., Flash memory) is defined as starting at location 0x1000 and also being 0x1000 bytes. There is a generic Wi-Fi card (memory mapped) at 0x2000 and extending for 0x1000 bytes.

Now we will describe how a vulnerability might be exposed using the described descriptive intermediate language with respect to a sample program.

As an example of errant code, consider the following subroutine:

```
void misc( ) {
    char b[5];
    b[2] = 'B';
}
void bad( ){
    char a[16];
    a[16] = 'F';'
    misc( );
}
int main( ) {
    bad( );
    return 0;
}
```

This simple routine, "bad( )" has a flaw that is often overlooked, in that a local character array is defined as holding sixteen bytes (char a[16]) and then a value is written to a location beyond the sixteen bytes (a[0] to a[15] are valid locations in a character array of 16 bytes). Since this array is local to the subroutine bad( ) when bad( ) is called, space for the array is allocated on the stack. Therefore, when 'F' is written beyond the last address in the array, a, the value of 'F' (0x25) will overwrite a location of the stack other than what is intended, for example, the return address will be overwritten.

Now, when the subroutine bad( ) is called as above, locations of the stack will be overwritten with 0x25, causing what is known as a buffer overflow. Although this operation is likely an unintentional coding error, debugging to find this error is difficult and often errors like this wind up in production code.

Compiling the subroutine bad( ) results in the following x86 instructions:

```
bad( ):
    push   rbp
    mov    rbp, rsp
    sub    rsp, 0x10 ;allocate 16 bytes for the array
    mov    BYTE PTR [rbp+0x10], 0x46 ;store 'F'
    call   1c   ;call misc
    nop
    leave
    ret
```

Compiling the subroutine misc( ) results in the following x86 instructions:

```
misc( ):
    push   rbp
    mov    rbp, rsp
    mov    BYTE PTR [rbp-3], 0x42
    nop
    pop    rbp
    ret
```

Compiling the calling program (main( ) results in the following x86 instructions:

```
main:
    push   rbp
    mov    rbp, rsp
    call   0x28
    mov    eax, 0
    pop    rbp
    ret
```

Lifting this above code into the descriptive intermediate language results in:

```
misc( ):
0x00,1: $temp:8 = COPY RBP
0x00,2: RSP = INT_SUB RSP, 8:8
0x00,3: STORE ram(RSP), $temp
0x01,1: RBP = COPY RSP
0x04,1: $address:8 = INT_SUB RBP, 3:8
0x04,2: $value:8 = COPY 66:8
0x04,3: STORE ram($address), $value
0x09,1: RBP = LOAD ram(RSP)
0x09,2: RSP = INT_ADD RSP, 8:8
```

```
        0x0a,1: $address = LOAD ram(RSP)
        0x0a,2: RSP = INT_ADD RSP, 8:8
        0x0a,3: RETURN $address
            bad( ):
        0x0b,1: $temp:8 = COPY RBP
        0x0b,2: RSP = INT_SUB RSP, 8:8
        0x0b,3: STORE ram(RSP), $temp
        0x0c,1: RBP = COPY RSP
        0x0f,1: RSP = INT_SUB RSP 16:8
        0x13,1: RSP = INT_SUB RSP, 8:8
        0x13,2: STORE ram(RSP), $instr_next
        0x17,1: $address:8 = INT_SUB RBP, 3:8
        0x17,2: $value:8 = COPY 66:8
        0x17,3: STORE ram($address), $value
        0x1d,1: RBP = LOAD ram(RSP)
        0x1d,2: RSP = INT_ADD RSP, 8:8
        0x1e,1: $address = LOAD ram(RSP)
        0x1e,2: RSP = INT_ADD RSP, 8:8
        0x1e,3: RETURN $address
            main( ):
        0x1f,1: $temp:8 = COPY RBP
        0x1f,2: RSP = INT_SUB RSP, 8:8
        0x1f,3: STORE ram(RSP), $temp
        0x20,1: RBP = COPY RSP
        0x23,1: RSP = INT_SUB RSP, 8:8
        0x23,2: STORE ram(RSP), $instr_next
        0x23,3: CALL *[ram]0x0:8
        0x28,1: EAX = COPY 0:4
        0x2d,1: RBP = LOAD ram(RSP)
        0x2d,2: RSP = INT_ADD RSP, 8:8
        0x2e,1: RSP = INT_ADD RSP, 8:8
        0x2e,2: RETURN RIP
``` an algorithm to detect this kind of vulnerability is:

```
on each instruction
    if STORE and input = = = $instr_next
        add RSP, $instr_next in a call hash map
    if LOAD and input = = = ram(RSP)
        add $address, RSP in a possible return hash map
    if RETURN
        look up $address in the in the possible return hash map and get the
RSP it was read from
        look up that RSP in the call hash map and get the address that was
initially pushed on the stack as the return address
        verify that the address you are returning to is the same as the
address you initially pushed onto the stack
```

Figure 8:
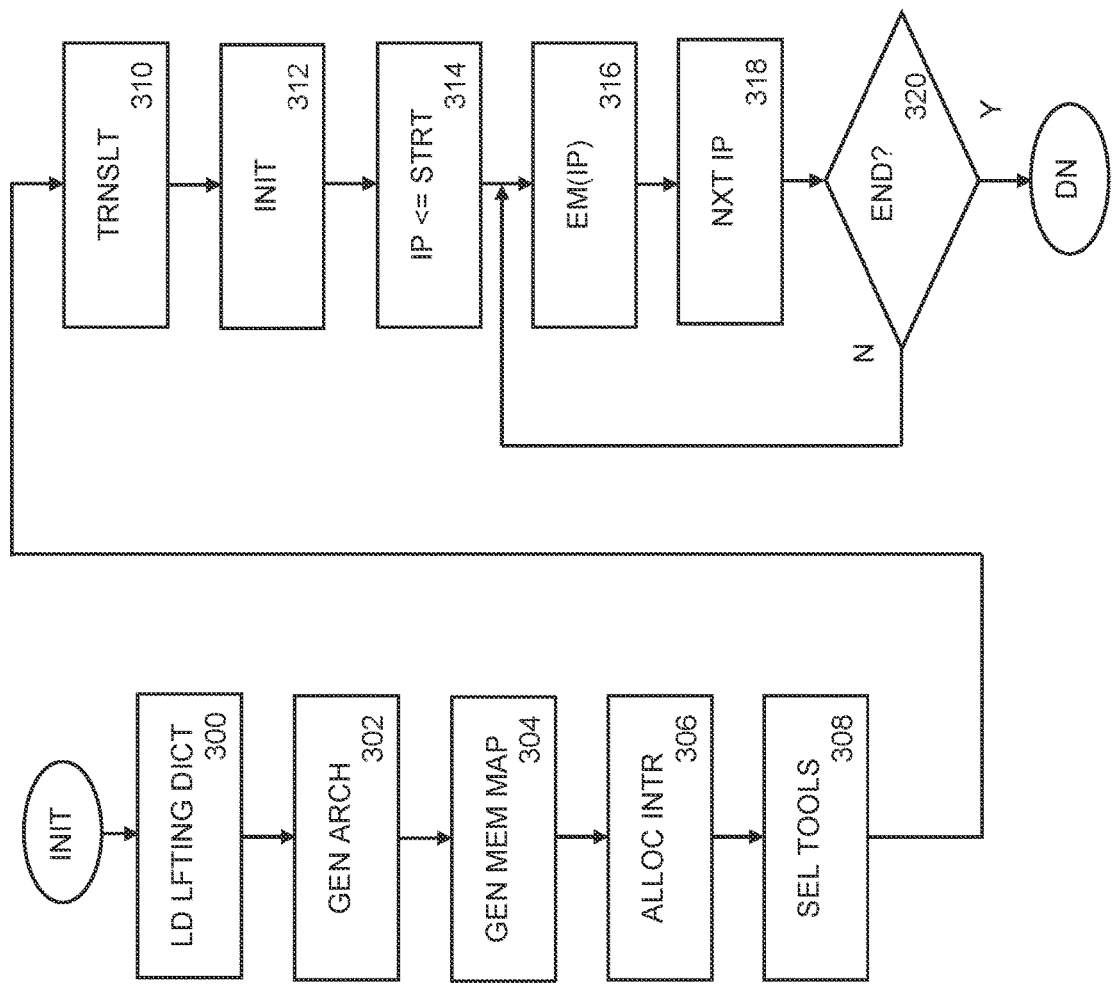
FIG. 8 illustrates an exemplary program flow of the system for software verification.

Referring to FIG. 8, an exemplary program flow of the system for software verification is shown. First, a lifting dictionary is created/loaded 300 for a target instruction set. Instructions in native computer instruction sets such as x86, ARM, MIPS, and PPC are optimized to decrease processing time, but are complex and make non-atomic changes to the state of the processor on which they run. Each instruction is capable of making several modifications to the internal state of a running system. In order to get a semantic understanding about instruction level data manipulation, instructions in the native computer instruction set are translated into a descriptive intermediate language (DIL). This process is called lifting. Each descriptive intermediate language (DIL) instruction represents exactly an atomic data manipulation operation. As such, each native instruction will translate into multiple DIL instructions. Each architecture has its own lifting dictionary describing how each native instruction of that architecture translates into a set of descriptive intermediate language (DIL) instructions. After a lifting dictionary for a target architecture is created/loaded 300, a target computational system needs to be described to the emulator.

Typically, a computational system consists of a processor, a main bus, and a set of connected devices as in the example of FIG. 7. Some such devices are additional buses with more devices connected thereto. In the real world, information is passed between devices through read, write, and interrupt operations over the bus. In the system for software verification, an architecture 302 of the target system that connects devices and buses is described to an emulator. The processor is described that executes instructions on each iteration of a run loop. A memory map is created 304 that describes the memory range for which each device is responsible. An interrupt is assigned 306 to each device, allowing the devices to send an interrupt to the processor just like is done on a real computational system. Once the devices are properly laid out and described, the tools and algorithms that will handle the analysis are chosen 308.

Tools that scan for vulnerable code are made to be aware of how the internal state of a target computation system is changing. As the emulator executes each instruction, the tools are informed about how the internal state is being modified by each descriptive intermediate language (DIL) instruction. The tools lift each descriptive intermediate language (DIL) instruction and analyze how the state is being modified by that descriptive intermediate language (DIL) instruction. Given that this emulator is executing the descriptive intermediate language (DIL) instructions instead of native instructions, the analysis tools guarantee that data transformations are happening as expected. After the analysis tools are chosen, the target software needs to be lifted/translated 310.

The target software is a set of instructions in a given native instruction set. Since the emulator runs the descriptive intermediate language (DIL) instruction set instead of any native instruction set, the target software needs to be translated 310 into the descriptive intermediate language (DIL) instructions. The system for software verification uses the appropriate Lifting Dictionary to translate the target software into a set of descriptive intermediate language (DIL) instructions. An initial state now needs to be set 312 before the emulator can begin executing the translated instructions.

The initial state is the configuration of each device at the beginning of an emulation. For example, a hard drive will have certain information stored in it to help with the boot process. Also, an ethernet adapter may be listening for data. The initial state is set 312 to represent the system before emulation is performed.

The emulator is a software-based instruction execution environment. The emulator's instruction pointer is set 314 to the starting point in the descriptive intermediate language (DIL) instructions that were previously created. In a loop, a processor that executes instructions based on each iteration of the running loop 316/318/320, each instruction is executed in the emulator. Read and write calls are passed through the main system bus to the appropriate device (determined by a memory map), and interrupts are triggered by devices to signal the processor about changes in device state. As each instruction is emulated 316, the analysis tools are informed about changes in the system state, then the next descriptive intermediate language (DIL) instruction 318 is selected.

Analysis tools are anticipated contain complicated algorithms to examine the emulator recorded state changes. Reports generated by these algorithms are used to determine if the internal state is being modified in an unsafe way. The reports also provide information to make determinations about possible modifications to the initial state that might cause unsafe operations.

Historically, emulated environments are run on a desktop or, in a limited way, on a server. Configuring a system to run these emulated environments is very complex. The system for software verification provides the emulation environment and all resource intensive operations are performed, by default, on a preconfigured remote system. If more resources need be allocated to the task of scanning for vulnerable code, a cloud-like environment is expandable and is reallocated to support the needs of the task. If the emulation environment requires specific software packages or kernel versions, such is performed automatically on the cloud-like environment. Since, in such embodiments, the emulator runs remotely on the cloud-like environment, a web browser-based interface is provided for user interaction with system for software verification.

In some embodiments, the system for software verification combines the above steps with a cloud-computing environment. The disclosed invention is needed in the realm of cyber security and is important to the future security of the world's data.

Equivalent elements can be substituted for the ones set forth above such that they perform in substantially the same manner, in substantially the same way, for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for software verification, the system comprising:
    a computer having a non-transitory memory;
    software running from the non-transitory memory of the computer, the software reads machine-language code that is for running on a target computer system and converts the machine-language code into a descriptive intermediate language version of the machine-language code, the software lifts the machine-language code using a dictionary of a descriptive intermediate language;
    the software runs the descriptive intermediate language version of the machine-language code in an emulation environment, the emulation environment provides abstractions of hardware subsystems of the target computer system that model device behaviors that are not captured in the descriptive intermediate language version of the machine-language code including input ports, output ports, interrupts, and/or direct memory access; and
    after the software runs the descriptive intermediate language version of the machine-language code, the software analyzes a state of the emulation environment to uncover abnormalities in the descriptive intermediate language version of the machine-language code;
    wherein the emulation environment further provides instruments for monitoring operation of the descriptive intermediate language version of the machine-language code as the descriptive intermediate language version of the machine-language code is run in the emulation environment and wherein one of the instruments comprises monitoring ranges of uninitialized memory for read operations.

2. The system of claim 1, wherein the descriptive intermediate language is an atomic language, in that, each instruction of the descriptive intermediate language performs exactly one operation.

3. The system of claim 1, wherein after the software converts the machine-language code into the descriptive intermediate language version of the machine-language code, the descriptive intermediate language version of the machine-language code is scanned for known vulnerabilities using a library of vulnerabilities.

4. The system of claim 3, wherein the descriptive intermediate language version of the machine-language code is further manually scanned by a person looking for additional vulnerabilities.

5. The system of claim 4, wherein when the additional vulnerabilities are found by the person, the additional vulnerabilities are added to the library of the vulnerabilities.

6. The system of claim 1, wherein the abstractions of the hardware subsystems of the target computer system comprise an abstraction describing memory.

7. A method of software verification, the method comprising:
    reading machine-language code that is for running on a target computer system and converting the machine-language code into a descriptive intermediate language version of the machine-language code including lifting the machine-language code using a dictionary of a descriptive intermediate language;
    running the descriptive intermediate language version of the machine-language code in an emulation environment, providing abstractions of hardware subsystems of the target computer system by the emulation environment, the abstractions of the hardware subsystems comprising abstractions of input ports, output ports, interrupts, and direct memory access;
    analyzing the descriptive intermediate language version of the machine-language code using a library of known vulnerabilities, thereby uncovering abnormalities in the descriptive intermediate language version of the machine-language code; and
    after running the descriptive intermediate language version of the machine-language code in the emulation environment, analyzing a state of the emulation environment to uncover abnormalities in the descriptive intermediate language version of the machine-language code;
    wherein the emulation environment further provides instruments for monitoring operation of the descriptive intermediate language version of the machine-language code as the descriptive intermediate language version of the machine-language code is run in the emulation environment and wherein one of the instruments comprises monitoring ranges of uninitialized memory for read operations.

8. The method of claim 7, wherein the descriptive intermediate language is an atomic language, in that, each instruction of the descriptive intermediate language performs exactly one operation.

9. The method of claim 7, further comprising scanning the descriptive intermediate language version of the machine-language code by a person looking for additional vulnerabilities.

10. The method of claim 9, wherein when the additional vulnerabilities are found by the person, adding the additional vulnerabilities to the library of vulnerabilities.

11. The method of claim 7, wherein the abstractions of the hardware subsystems comprise describing a memory of the target computer system.

12. Program instructions tangibly embodied in a non-transitory storage medium for providing software verification, wherein at least one instruction comprises:
    computer readable instructions running on a server, the computer readable instructions causes the server to read machine-language code that is for running on a target computer system and to convert the machine-language code into a descriptive intermediate language version of the machine-language code, the computer readable instructions running on the server lifts the machine-language code using a dictionary of a descriptive intermediate language;
    the computer readable instructions running on the server runs the descriptive intermediate language version of the machine-language code in an emulation environment and provides abstractions of hardware subsystems of the target computer system by the emulation environment, the abstractions of the hardware subsystems model device behaviors that are external to the descriptive intermediate language version of the machine-language code;
    the computer readable instructions running on the server analyzes the descriptive intermediate language version of the machine-language code using a library of known vulnerabilities, thereby the computer readable instructions running on the server uncovers abnormalities in the descriptive intermediate language version of the machine-language code;
    after the computer readable instructions running on the server runs the descriptive intermediate language version of the machine-language code in the emulation environment, analyzing a state of the emulation environment to uncover abnormalities in the descriptive intermediate language version of the machine-language code; and
    the computer readable instructions running on the server further provides instruments within the emulation environment, the instruments monitoring operation of the descriptive intermediate language version of the machine-language code as the computer readable instructions running on the server run the descriptive intermediate language version of the machine-language code in the emulation environment and wherein one of the instruments comprises monitoring ranges of uninitialized memory and watching for read operations.

13. The program instructions tangibly embodied in the non-transitory storage medium of claim 12, wherein the descriptive intermediate language is an atomic language, in that, each instruction of the descriptive intermediate language performs exactly one operation.

14. The program instructions tangibly embodied in the non-transitory storage medium of claim 12, wherein the abstractions of the hardware subsystems comprise describing a memory of the target computer system.

* * * * *